US012608209B2

(12) United States Patent
Kiss et al.

(10) Patent No.: US 12,608,209 B2
(45) Date of Patent: Apr. 21, 2026

(54) OPERATING SYSTEM PAGESIZE COMPATIBILITY WORKAROUNDS

(71) Applicant: Arm Limited, Cambridge (GB)

(72) Inventors: Dániel Kristóf Kiss, Pomáz (HU); Branislav Rankov, Cambridge (GB); Ian James Rickards, Cambridge (GB)

(73) Assignee: ARM LIMITED, Cambridge (GB)

( * ) Notice: Subject to any disclaimer, the term of this patent is extended or adjusted under 35 U.S.C. 154(b) by 148 days.

(21) Appl. No.: 18/442,535

(22) Filed: Feb. 15, 2024

(65) Prior Publication Data

US 2025/0060966 A1     Feb. 20, 2025

Related U.S. Application Data

(60) Provisional application No. 63/532,802, filed on Aug. 15, 2023.

(51) Int. Cl.
*G06F 9/38*          (2018.01)

(52) U.S. Cl.
CPC .......... *G06F 9/3816* (2013.01); *G06F 9/3804* (2013.01)

(58) Field of Classification Search
CPC .............................. G06F 9/3804; G06F 9/3816
See application file for complete search history.

(56) References Cited

U.S. PATENT DOCUMENTS

| | | | |
|---|---|---|---|
| 2005/0114845 A1* | 5/2005 | Devor | G06F 9/3816 717/130 |
| 2006/0095895 A1* | 5/2006 | K. | G06F 11/3644 714/E11.178 |
| 2006/0149943 A1* | 7/2006 | Erb | G06F 30/33 712/234 |
| 2017/0212825 A1* | 7/2017 | Caprioli | G06F 8/40 |

OTHER PUBLICATIONS

Li, Jianjun, et al., "An Evaluation of Misaligned Data Access Handling Mechanisms in Dynamic Binary Translation Systems," 2009 International Symposium on Code Generation and Optimization, Mar. 2009, pp. 180-189, IEEE.
Combined Search and Examination Report issued in United Kingdom Application No. 2410825.0, mailed Dec. 17, 2024, 6 pages.

* cited by examiner

*Primary Examiner* — Terrell S Johnson
(74) *Attorney, Agent, or Firm* — Talem IP Law, LLP

(57)          ABSTRACT

A method is presented that includes detecting, by a loader, overlapping permissions for a page while loading a binary file. When writable data overlaps with read-only code in a page, the loader copies the code part of the page with the overlapping permissions to a new page. The original page is set non-executable. The new page can be set executable but read-only. When execution reaches the now non-executable original page, a segmentation fault may be raised. A signal handler installed by the loader detects that the fault is coming from the original page and redirects execution to the new page with the copied code part.

20 Claims, 6 Drawing Sheets

200

202
Detecting overlapping permissions of segments for a page while loading a binary file 204
Copying at least one segment of the segments having the overlapping permissions to a new page 206
Setting the original page as non-executable

200

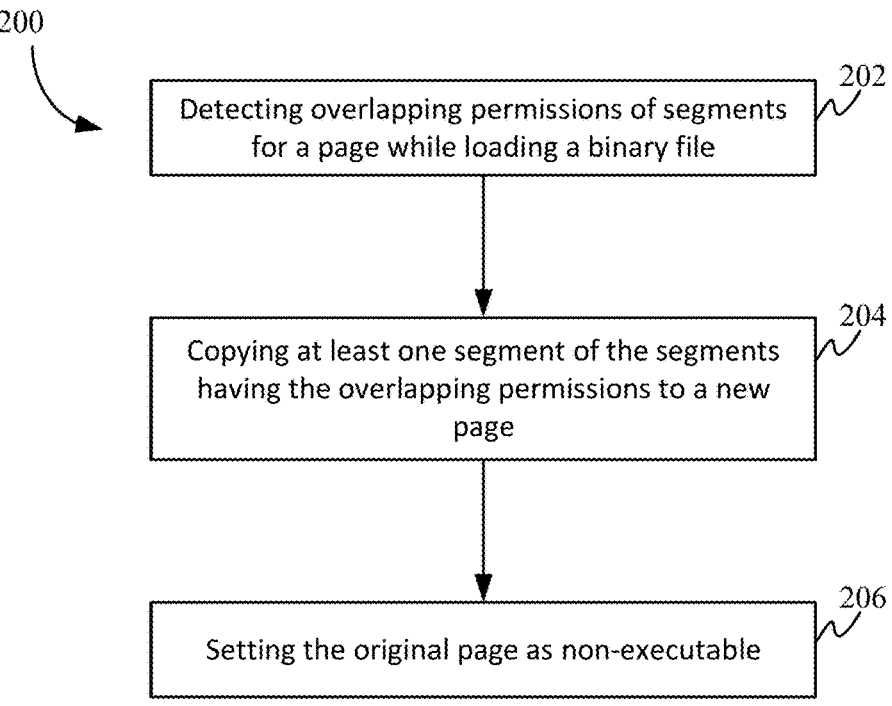

| 202 |
| Detecting overlapping permissions of segments for a page while loading a binary file |

| 204 |
| Copying at least one segment of the segments having the overlapping permissions to a new page |

| 206 |
| Setting the original page as non-executable |

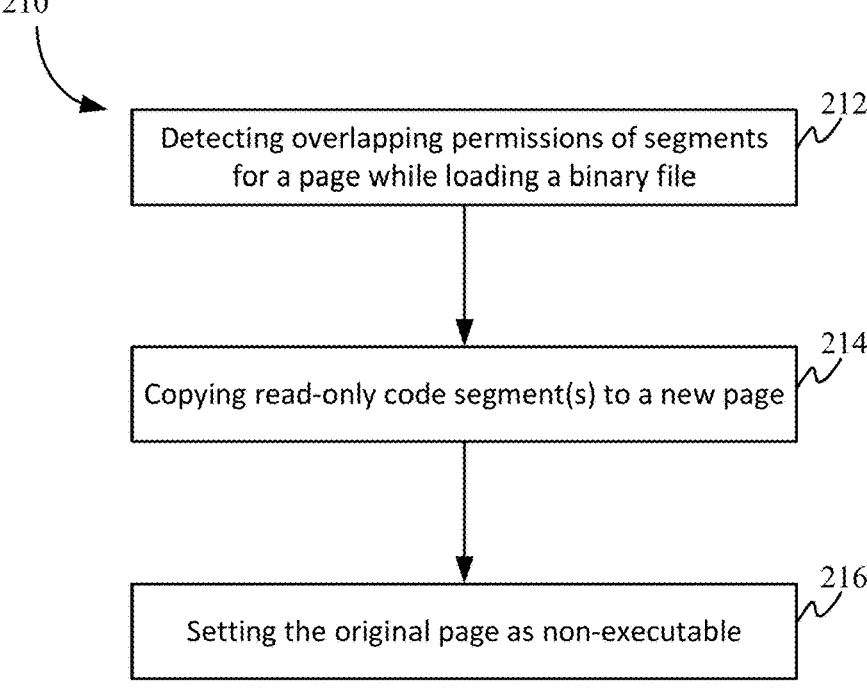

| 212 |
| Detecting overlapping permissions of segments for a page while loading a binary file |

| 214 |
| Copying read-only code segment(s) to a new page |

| 216 |
| Setting the original page as non-executable |

Figure 2B

OPERATING SYSTEM PAGESIZE COMPATIBILITY WORKAROUNDS

BACKGROUND

Unix and Unix-like systems may use executable and linkable format (ELF) files for executable images and dynamic libraries. The ELF file structure includes a program header that describes memory segments that contain information needed for run time execution of a file, a section header that describes sections that contain data for linking and relocation, and the data referred to by the entries in the program header and section header. ELF files can include .text (e.g., for code), .data (e.g., for read/write data), and .bss (e.g., for uninitialized arrays and variables).

Applications on some operating systems (e.g., Android) contain native code that are by default linked with 4 KB ELF segment alignment. Segment alignment refers to the alignment of a segment of a file (e.g., the ELF file) to a memory page. For a segment to be aligned to the memory page, the segment's offsets and virtual addresses are congruent modulo the pagesize of the memory page. That is, an address is considered aligned to a memory page when the address is an exact multiple of the pagesize of the memory page.

A memory page is a fixed length contiguous block of virtual memory described by an entry on a page table. The pagesize of a memory page is generally determined by a processor architecture (e.g., instruction set, processor type, addressing mode) and selected by the operating system. On a system with 16 KB pagesize, the 4 KB ELF segments' permissions of the default configuration of certain operating systems can only be set at 16 KB granule. Therefore, 4 KB aligned segments that end up in a single 16 KB page have to combine their permissions.

BRIEF SUMMARY

Operating system pagesize compatibility workarounds are described. When segments of a binary file are smaller than the pagesize of a memory page, it is possible that the permissions of two segments within a particular memory page are incompatible. Techniques are presented that can mitigate security risk for such operating systems.

A loader is described that makes adjustments while loading a binary file to ensure compatibility while maintaining security of the binary file in systems where segments of the binary file may not align to a pagesize of a memory page. A shared library (e.g., libc), including a signal handler, leverages the adjustments made by the loader.

A method is presented that includes detecting, by a loader, overlapping permissions of segments for a page while loading a binary file. The overlapping permissions of segments for the page can be for a segment of writable data and a segment of read-only code. When writable data overlaps with read-only code in a page (e.g., due to non-alignment of the segments), the loader copies the code part of the page with the overlapping permissions to a new page. The original page is set non-executable. The new page can be set executable but read only.

When execution reaches the now non-executable original page, a segmentation fault may be raised. A signal handler installed by the loader detects that the fault is coming from the original page and redirects execution to the new page with the copied code part.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A-2C illustrate a method performed by a loader according to an embodiment of the invention.

DETAILED DESCRIPTION

Operating system pagesize compatibility workarounds are described. When segments of a binary file are smaller than the pagesize of a memory page, it is possible that the permissions of two segments within a particular memory page are incompatible. Techniques are presented that can mitigate security risk for such operating systems.

A loader is described that makes adjustments while loading a binary file to ensure compatibility while maintaining security of the binary file in systems where segments of the binary file may not align to a pagesize of a memory page. A shared library, including a signal handler, leverages the adjustments made by the loader.

The described loader may be a dynamic linker. A dynamic linker of an operating system such as Linux loads and links the shared libraries used by an executable code. The dynamic linker is used to load a 4 KB aligned shared library into 16 KB pages. A problem with systems having the 16 KB pagesize granularity is the resulting combination of permissions of different 4 KB segments. Through the described techniques it is possible to preserve the security of the read only (RO)-code (.text)/read/write (RW)-data (.data) boundary, avoiding pages with read, write, execute (RWX) permission for different 4 KB segments.

Figure 1:
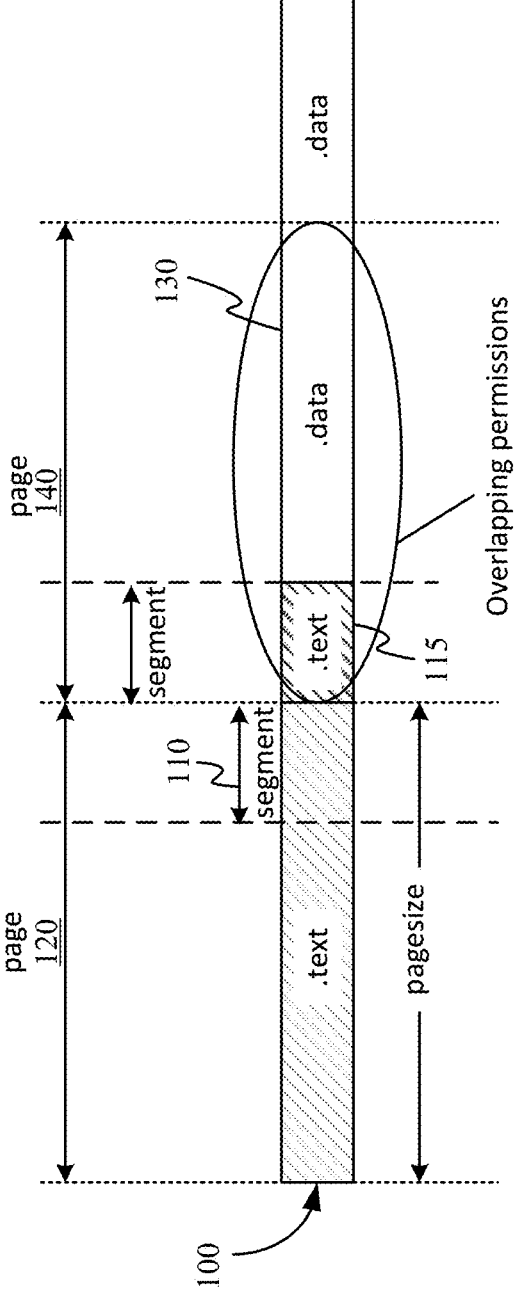
FIG. 1 shows misalignment of segments resulting in overlapping permissions on a page.

FIG. 1 shows misalignment of segments resulting in overlapping permissions on a page.

Referring to FIG. 1, a binary file 100 includes read only code (.text) and read/write data (.data). As can be seen, multiple segments (e.g., including segment 110) of the binary file 100 can make up a page (e.g., page 120). While at compile time, the page may be set at one pagesize, at runtime, the page may have a larger pagesize (e.g., 4 KB at compiler time and 16 KB at runtime). However, when the segments are not congruent modulo the pagesize, it is possible that a segment 115 of read only code and segments 130 of read/write data are on the same page 140. This results in overlapping permissions of segments for the page 140. If the page security values are assigned as for the read only code, which allow for execution, then there can be an exploitable weakness where data (e.g., from the segments 130 of read/write data) may be treated as executable. Similarly, if the page security values are assigned as for the read/write data, which permit writing and do not permit execution, then parts of the code (e.g., from segment 115 of the read only code) become ineffective/inoperable.

As a workaround to minimize or avoid these overlapping permissions on a page, a loader can identify misaligned boundaries of a binary file and apply one or more corrections.

Figure 2C:
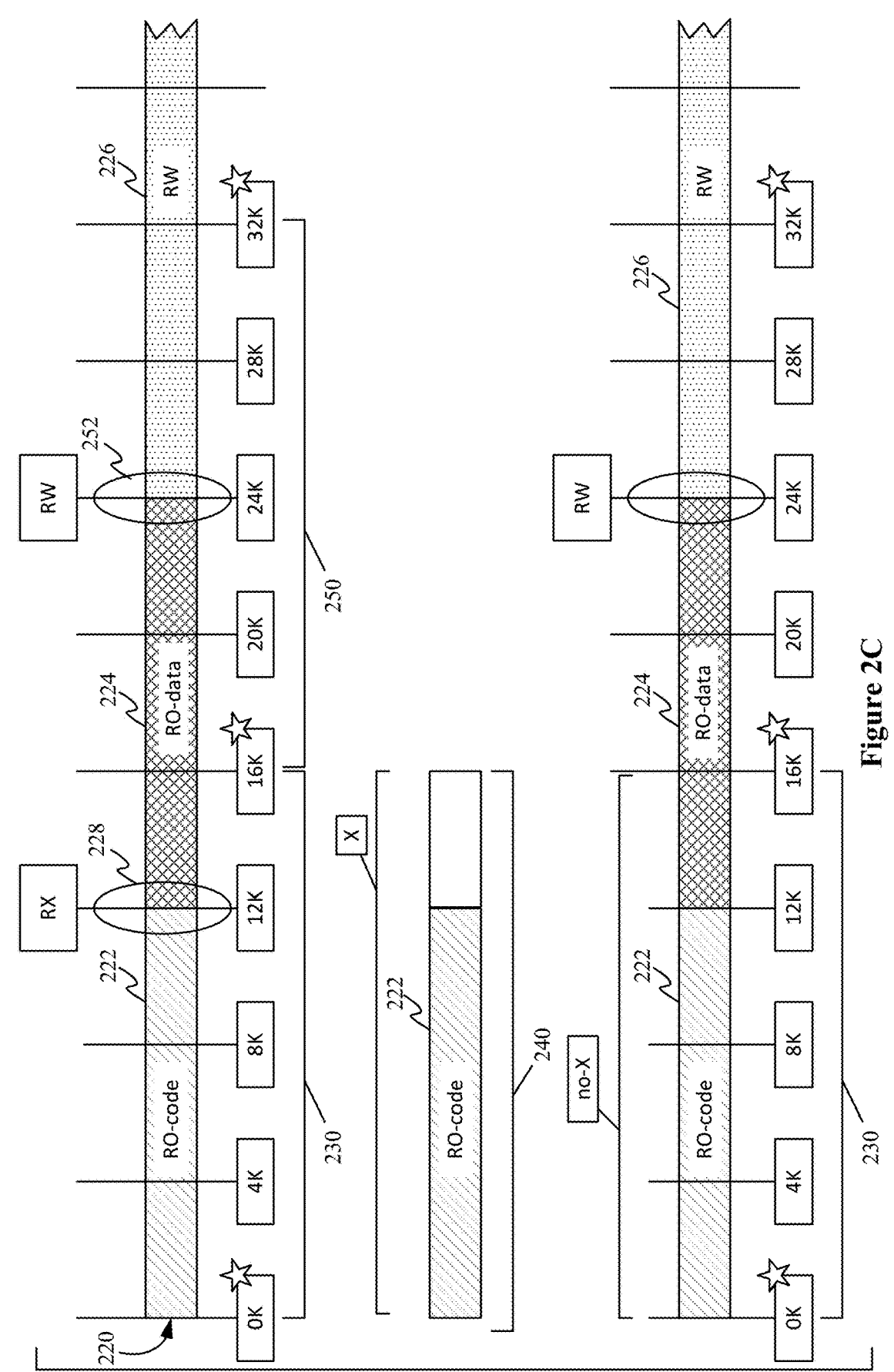

FIGS. 2A-2C illustrate a method performed by a loader according to an embodiment of the invention. Referring to FIG. 2A, a method 200 for providing an operating system pagesize compatibility workaround includes detecting (202) overlapping permissions of segments for a page while loading a binary file; copying (204) at least one segment of the segments having the overlapping permissions to a new page (e.g., where the at least one segment corresponds to the one or more segments of a part of the page with one type of permission that is incompatible with another part of the page); and setting (206) the original page as non-executable. When the overlapping permissions include executable and non-executable, the particular segment(s) copied to the new page can be those containing code. For example, as shown in FIG. 2B, a method 210 for providing an operating system pagesize compatibility workaround can include detecting (212) overlapping permissions of segments for a page while loading a binary file (e.g., when the segments for the page comprise a writable data segment and a read-only code segment); copying (214) read-only code segment(s) of the segments having the overlapping permissions to a new page; and setting (216) the original page as non-executable. An illustrative example of method 210 is shown in FIG. 2C.

Referring to FIG. 2C, a binary file 220 that includes read-only code (RO-code) 222, read-only data (RO-data) 224, and read-write data (RW) 226 may be loaded for execution/use by a computing system. As can be seen, because the segment size of 4 KB can form portions having a same type of permissions that are not congruent modulo the pagesize of 16 KB, there can exist overlapping permissions on a page. In the illustrated example, RO-code 222 includes three 4 KB segments, RO-data 224 includes three 4 KB segments, and read-write data 226 includes more than three 4 KB segments. Since the RO-code 222 is one segment short of a 16K page, a loader performing method 210 as shown in FIG. 2B, detects overlapping permissions (e.g., at a read, execute permissions boundary 228) of segments for page 230 while loading the binary file 220. It can be seen that the read, execute permissions (RX) boundary 228 falls within the page 230.

Accordingly, when the loader encounters the overlapping permissions, the loader copies the code part (e.g., RO-code 222) of the page 230 with the overlapping permissions to a new page 240. The new page 240 is set executable. New page 240 may be set read only as well. As illustrated in FIG. 2C, the original page 230 is set non-executable. The other permissions for the original page 230 may be read only or read/write, depending on implementation.

As also can be seen in FIG. 2C, other parts of the binary file 220 may result in overlapping permissions. Here, page 250 has a read/write boundary 252 within the page. In some cases, each time overlapping permissions are encountered, the copying (204) to a new page and setting (206) of permissions of the original page can be performed. In some cases, a shifting operation can be applied before performing method 210 (or method 200) to change a boundary location.

Figure 3:
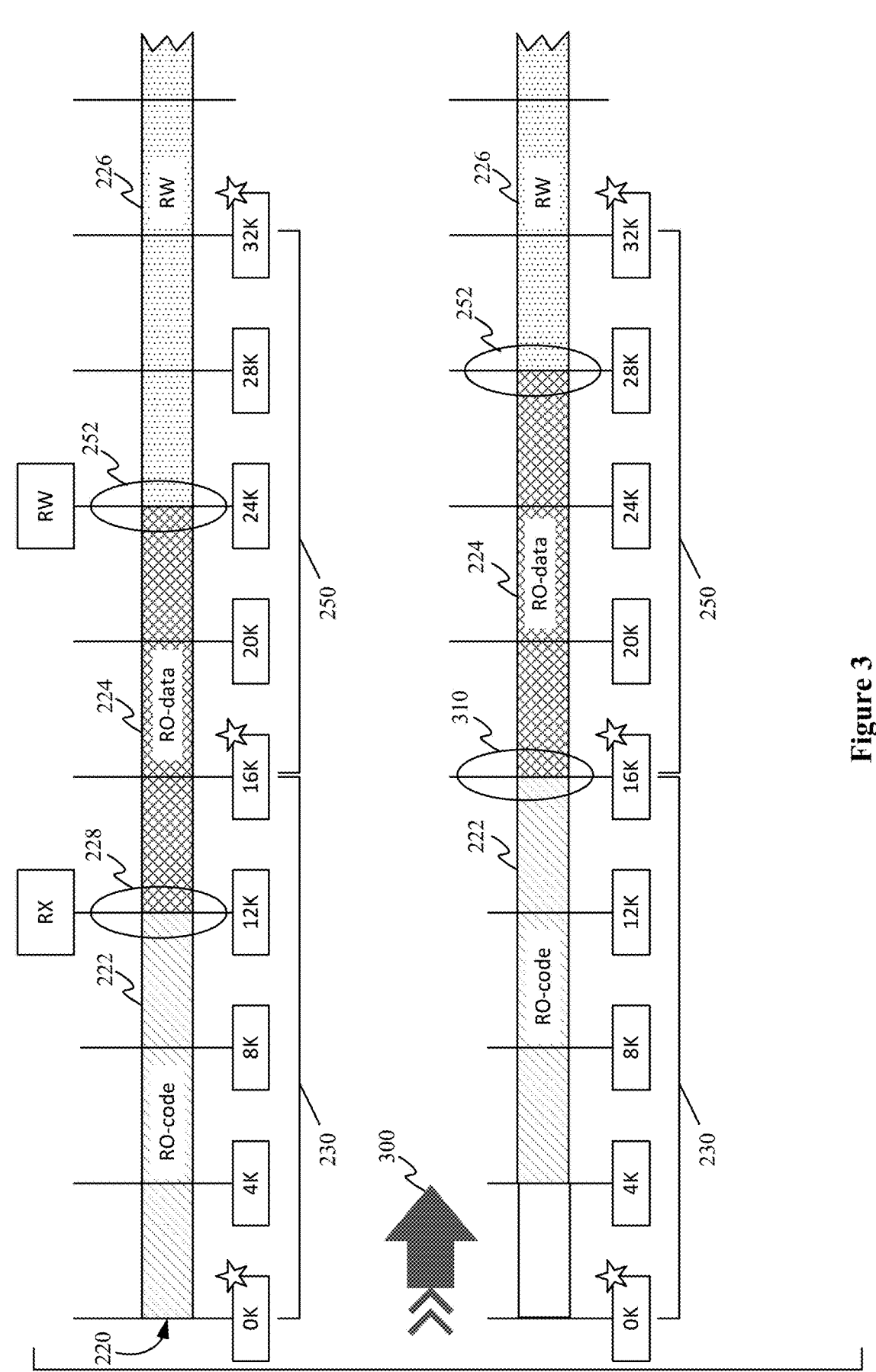
FIG. 3 illustrates an additional correction that can be applied by a loader.

FIG. 3 illustrates an additional correction that can be applied by a loader. Referring to FIG. 3, a shifting operation can be carried out to align a boundary before applying operations 204 and 206 of method 200 or operations 214 and 216 of method 210. For example, during operation 202 of method 200 or operation 212 of method 210, misaligned boundaries can be identified and a particular misaligned boundary can be selected as the boundary to shift into alignment with a page. For example, as can be seen in FIG. 3, there are two misaligned boundaries—the read, execute permissions (RX) boundary 228 falls within the page 230 and the read/write boundary 252 within the page 250.

For a binary file having an ELF file structure (among other file structures), there can be three different sets of permissions. A memory page of ELF segments can be positioned at any address in the memory (e.g., at 0 KB or 12 KB, etc.). Therefore, the starting address of a page can be selected to adjust for the fixed boundary offset points; and, thus, the starting position of the binary file can be shifted to ensure that the desired permission is within a desired boundary. This can ensure that at least one of the sections will be positioned such that it has the correct permissions. In some cases, the selection of the boundary to shift to alignment is the first misaligned boundary encountered. In some cases, the shifting is based on rules or certain criteria. In some cases, the page is shifted to put the permission block that may be the most difficult to fix (e.g., difficulty with respect to fixing by a copying to another page as in applying operations 204, 214 and 206, 216 and leveraging this workaround by a signal handler installed by the loader) or the permission block with profiling data within the boundary of the 16K alignment.

As illustrated in FIG. 3, the boundary 228 between the RO-code 222 and RO-data 224 in page 230 can be aligned to the page 230 by shifting 300 the binary file 220 to cause the particular internal boundary between segments (e.g., boundary 228) to be aligned to a pagesize boundary (e.g., boundary 310). It can be seen that in this illustrative example, the boundary 252 between the RO-data 224 and the RW data 226 is still not aligned to a pagesize boundary. In some cases, operations 204 and 206 can be applied, for example, to the RO-data 224 segments in page 250.

Figure 4:
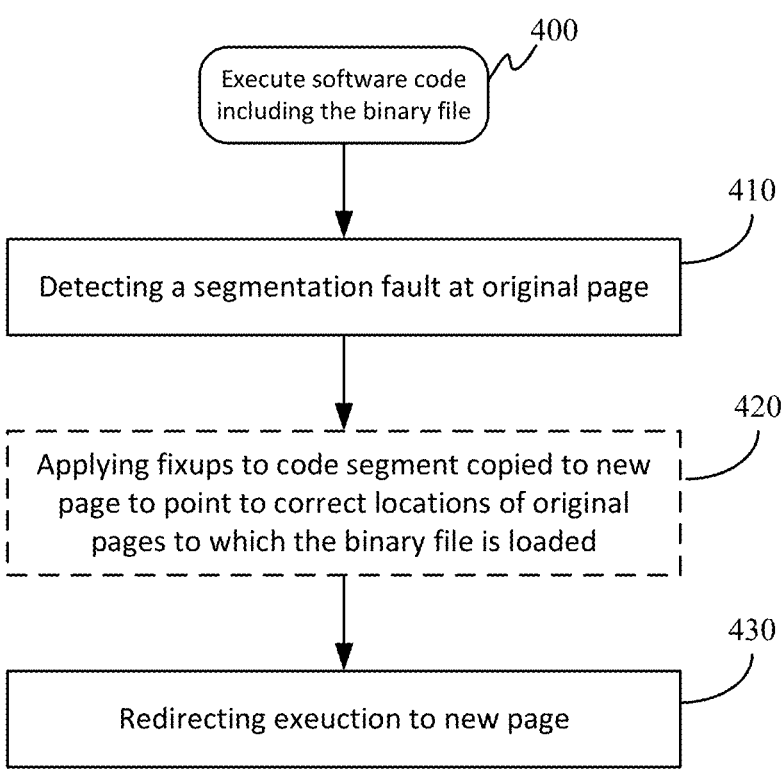
FIG. 4 shows a process flow example of a signal handler leveraging adjustments made by a loader as described herein.

FIG. 4 shows a process flow example of a signal handler leveraging adjustments made by a loader as described herein. Referring to FIG. 4, during execution (400) of software code comprising the binary file (having the read-only code segment that is not aligned to a pagesize boundary), a method includes detecting (410), by a signal handler, a segmentation fault at the page; and in response to the segmentation fault, redirecting (430) execution to the new page. The method can further include applying (420) fixups to the read-only code segment copied to the new page to point to correct locations of original pages to which the binary file is loaded. The signal handler can be installed by the loader. In some cases, two guard pages are inserted around the copied page. If execution reaches either guard page, the signal handler redirects execution to the neighboring pages of the original page.

Figure 5A:
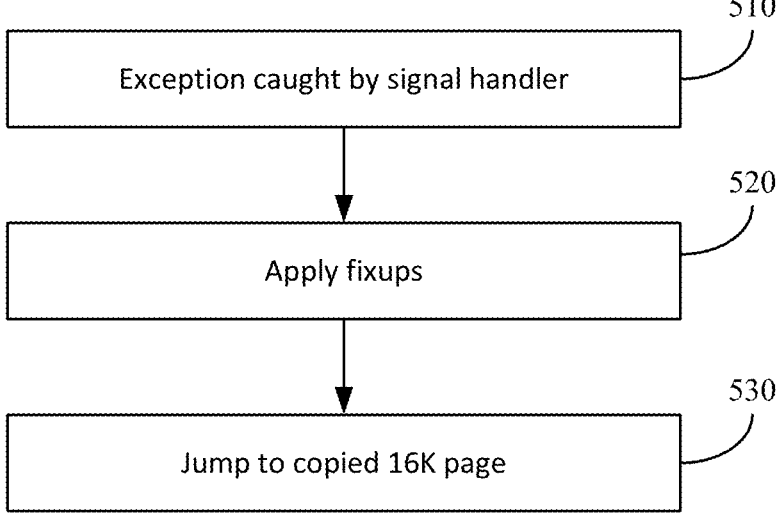
FIGS. 5A and 5B illustrate an example implementation of execution of software code including a binary file loaded in accordance with embodiments described herein.
Figure 5B:
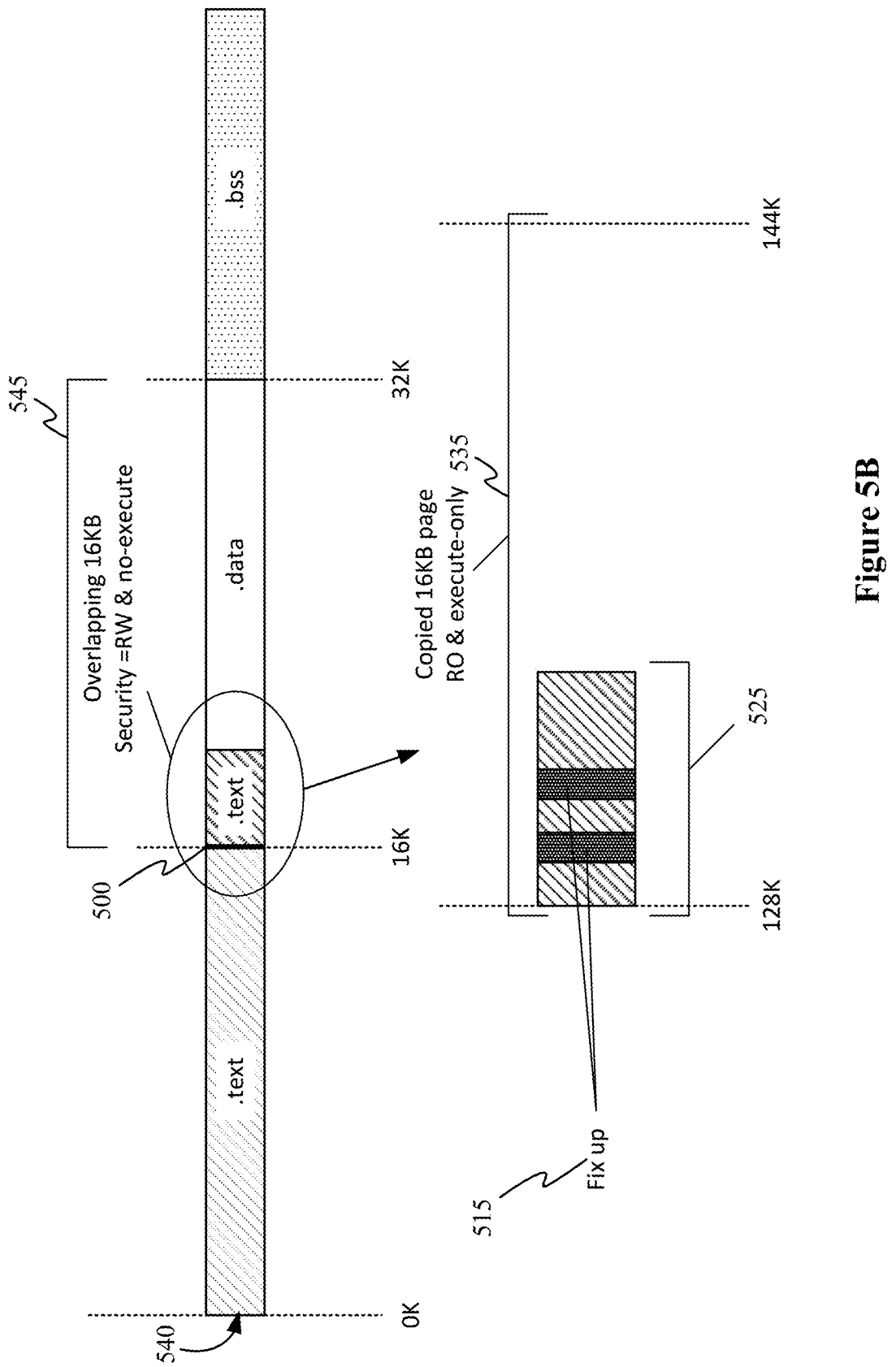

FIGS. 5A and 5B illustrate an example implementation of execution of software code including a binary file loaded in accordance with embodiments described herein.

Referring to FIGS. 5A and 5B, during execution, when an exception 500 is caught (510) by a signal handler of the operating system, fixups 515 are applied (520) to the code for the copied segment 525, and a jump (530) is made to the copied 16 KB page 535. That is, after performing method 210 such as described with respect to FIGS. 2B and 2C on the binary file 540, the original page 545 is set with security permissions of no-execute and the copied page 535 is set with security permissions of execute.

When execution reaches the now non-executable original page 545, a segmentation fault may be raised (and the exception caught by the signal handler). Indeed, the signal handler detects (e.g., in operation 510) that the fault is coming from the original page 545 and redirects execution to the copied page 535.

On the copied page, relative addresses are then updated (e.g., using fixups 515). There are three cases with respect to updating relative addresses for the copied page:

1. If a branch instruction's target is in the copied page, there is nothing to do.
2. If the instruction can reach the original address from its new position, then the instruction is patched with the new offset.
3. If a given instruction cannot reach the address, then a trap is inserted. The signal handler handles the trap, for conditional instructions, checks if the conditions are met, and loads the right value into the appropriate register or redirects execution to the appropriate address.

Accordingly, applying fixups (e.g., operation 420 of FIG. 4) can include determining a target of a branch instruction; if the target of the branch instruction is in the new page, applying no fixup; if the target of the branch instruction is able to reach an original address by an offset from the new page, patching the branch instruction with a new offset; and if the target of the branch instruction is not able to reach the original address by the offset from the new page, inserting a trap. Thus, when the fixups include the trap, during execution of the code (e.g., operation 400 of FIG. 4), the method can further include detecting, by the signal handler, the trap; and loading an appropriate value to an appropriate register based on conditional instructions or redirect execution to an appropriate address, depending on the fixup instruction.

The Fixups 515 can include adr (register-relative), adrp (address of 4 KB page at a PC-relative offset), b (branch unconditionally to a label at a PC-relative offset, with a hint that this is not a subroutine call or return), and b1 (backward jump to label 1) to point back to original .text/.data/.bss. The "fixups" may only need to be done when the page is first copied.

The adr instruction adds, for example, a 21-bit signed immediate to the current instruction's address.

The adrp instruction takes, for example, a 21-bit signed immediate, shifts it left a number of positions (e.g., 12 positions), and then adds it to the address of the starting byte of the page the current instruction is on.

The following are examples of the instructions in the instruction sets for ARM that may be handled in the above described manner: ADR, ADRP, B, B.cond, BC.cond, BL, CBZ, CBNZ, TBZ, TBNZ.

An advantage of this set-up is that there is no need to handle data placed in the code section. Since every data access still uses the original page, the copied page can be assumed to be pure code and is patched indiscriminately.

An alternative to trapping instructions that are out-of-range would be adding veneers. Adding veneers can require careful management of registers.

Applications and, for example, the Android Runtime (ART) may want to handle signals in their own way. Therefore, the signal handler installed by the loader operates in a manner that is transparent to the applications.

Preferably applications should not be able to replace the loader's signal handler. In certain embodiments, the loader's signal handler (which can operate as described with respect to FIGS. 4 and 5A-5B) ensures that applications' signal handlers' still receive the signals that were not meant for the loader's signal handler.

An application's signal handler itself might be on a copied page. This means that handling a signal will raise a new signal. However, such issues can be addressed in design of the described loader and signal handler.

The described loader and signal handler can be implemented as instructions stored in memory of a computing system and executed by a hardware processor of the computing system. The loader and signal handler may be at a same or similar level (in the hierarchy of computer system level architecture) as the operating system of the computing system. In some cases, the loader is a dynamic linker. In some cases, the loader is part of a kernel of the operating system.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A method comprising:
   detecting, by a loader, overlapping permissions of segments for an original page while loading a binary file, wherein the segments for the original page comprise a writable data segment and a read-only code segment;
   copying the read-only code segment to a new page; and
   setting the original page as non-executable.

2. The method of claim 1, further comprising:
   shifting the binary file to cause a particular internal boundary between segments to be aligned to a pagesize boundary.

3. The method of claim 2, further comprising selecting the particular internal boundary to shift to alignment based on difficulty with respect to fixing by a copying to another page.

4. The method of claim 1, wherein each segment is 4 KB aligned and a pagesize is 16 KB.

5. The method of claim 1, further comprising:
   inserting a first guard page before the new page and a second guard page after the new page.

6. The method of claim 5, further comprising:
   during execution of software code comprising the binary file having the read-only code segment, upon reaching the first guard page or the second guard page, redirecting execution to an appropriate neighboring page of the original page.

7. The method of claim 1, further comprising:
   during execution of software code comprising the binary file having the read-only code segment, detecting, by a signal handler, a segmentation fault at the original page; and
   in response to the segmentation fault, redirecting execution to the new page.

8. The method of claim 7, further comprising:
   applying fixups to the read-only code segment copied to the new page to point to correct locations of original pages to which the binary file is loaded.

9. The method of claim 8, wherein applying the fixups comprises:
   determining a target of a branch instruction;
   if the target of the branch instruction is in the new page, applying no fixup;
   if the target of the branch instruction is able to reach an original address by an offset from the new page, patching the branch instruction with a new offset; and if the target of the branch instruction is not able to reach the original address by the offset from the new page, inserting a trap.

10. The method of claim 9, wherein the fixups include the trap, the method further comprising:

detecting, by the signal handler, the trap; and loading an appropriate value to an appropriate register or redirecting execution to an appropriate address based on conditional instructions.

11. A non-transitory computer-readable storage medium having instructions stored thereon that when executed by a processor direct a computing system to:

detect, by a loader, overlapping permissions of segments for an original page while loading a binary file, wherein the segments for the original page comprise a writable data segment and a read-only code segment;

copy the read-only code segment to a new page; and set the original page as non-executable.

12. The non-transitory computer-readable storage medium of claim 11, wherein the instructions further direct the computing system to:

shift the binary file to cause a particular internal boundary between segments to be aligned to a pagesize boundary.

13. The non-transitory computer-readable storage medium of claim 12, wherein the instructions further direct the computing system to:

select the particular internal boundary to shift to alignment based on difficulty with respect to fixing by a copying to another page.

14. The non-transitory computer-readable storage medium of claim 11, wherein each segment is 4 KB aligned and a pagesize is 16 KB.

15. The non-transitory computer-readable storage medium of claim 11, wherein the instructions further direct the computing system to:

insert a first guard page before the new page and a second guard page after the new page.

16. The non-transitory computer-readable storage medium of claim 15, wherein during execution of software code comprising the binary file having the read-only code segment, upon reaching the first guard page or the second guard page, the instructions further direct the computing system to:

redirect execution to an appropriate neighboring page of the original page.

17. The non-transitory computer-readable storage medium of claim 11, wherein during execution of software code comprising the binary file having the read-only code segment, the instructions further direct the computing system to:

detect, by a signal handler, a segmentation fault at the original page; and in response to the segmentation fault, redirect execution to the new page.

18. The non-transitory computer-readable storage medium of claim 17, wherein the instructions further direct the computing system to:

apply fixups to the read-only code segment copied to the new page to point to correct locations of original pages to which the binary file is loaded.

19. The non-transitory computer-readable storage medium of claim 18, wherein the instructions to apply the fixups direct the computing system to:

determine a target of a branch instruction;

if the target of the branch instruction is in the new page, apply no fixup;

if the target of the branch instruction is able to reach an original address by an offset from the new page, patch the branch instruction with a new offset; and if the target of the branch instruction is not able to reach the original address by the offset from the new page, insert a trap.

20. The non-transitory computer-readable storage medium of claim 19, wherein the fixups include the trap, wherein the instructions further direct the computing system to:

detect, by the signal handler, the trap; and load an appropriate value to an appropriate register or redirect execution to an appropriate address based on conditional instructions.

\* \* \* \* \*